US008522061B2

(12) United States Patent
Hebron et al.

(10) Patent No.: US 8,522,061 B2
(45) Date of Patent: Aug. 27, 2013

(54) METHOD AND APPARATUS OF POWER MANAGEMENT OF A NODE IN HOME ENTERTAINMENT NETWORK BY SHIFTING FROM A NORMAL STATE INTO EITHER A FIRST LOW POWER STATE BASED ON THE TRAFFIC AT THE NODE OR A SECOND LOW POWER STATE UPON RECEIPT OF A MESSAGE GRANTING A REQUEST FOR THE SECOND LOW POWER STATE AT THE NODE

(75) Inventors: Yoav Hebron, San Diego, CA (US); Michail Tsatsanis, Huntington Beach, CA (US); Changwen Liu, San Diego, CA (US); Na Chen, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 431 days.

(21) Appl. No.: 12/717,384

(22) Filed: Mar. 4, 2010

(65) Prior Publication Data
US 2010/0229015 A1    Sep. 9, 2010

Related U.S. Application Data

(60) Provisional application No. 61/157,810, filed on Mar. 5, 2009.

(51) Int. Cl.
*G06F 1/00* (2006.01)
*G08C 17/00* (2006.01)

(52) U.S. Cl.
USPC .......................................... 713/323; 370/311

(58) Field of Classification Search
USPC .......................................... 713/323; 370/311
See application file for complete search history.

(56) References Cited

U.S. PATENT DOCUMENTS

| 5,742,238 A * | 4/1998 | Fox ................................ 340/8.1 |
| 2003/0165142 A1 * | 9/2003 | Mills et al. ................. 370/395.62 |
| 2009/0064266 A1 * | 3/2009 | Wollmershauser et al. .. 725/134 |
| 2009/0092154 A1 * | 4/2009 | Malik et al. ................... 370/480 |
| 2009/0325566 A1 * | 12/2009 | Bell et al. ...................... 455/419 |
| 2010/0097969 A1 * | 4/2010 | De Kimpe et al. ............ 370/311 |

* cited by examiner

*Primary Examiner* — Thomas Lee
*Assistant Examiner* — Terrell Johnson
(74) *Attorney, Agent, or Firm* — Bruce Greenhaus; Richard Bachand; Duane Morris LLP (57) ABSTRACT

A power management system for home entertainment networks having three power states. The network controller is empowered to move nodes within the home entertainment network between the power states.

26 Claims, 7 Drawing Sheets

METHOD AND APPARATUS OF POWER MANAGEMENT OF A NODE IN HOME ENTERTAINMENT NETWORK BY SHIFTING FROM A NORMAL STATE INTO EITHER A FIRST LOW POWER STATE BASED ON THE TRAFFIC AT THE NODE OR A SECOND LOW POWER STATE UPON RECEIPT OF A MESSAGE GRANTING A REQUEST FOR THE SECOND LOW POWER STATE AT THE NODE

CROSS-REFERENCE TO RELATED APPLICATIONS

This application claims priority to U.S. Provisional Patent Application No. 61/157,810, filed Mar. 5, 2009, entitled Method and Apparatus of Power Management.

TECHNICAL FIELD

The disclosed method and apparatus relates to power management, and more particularly, some embodiments relate to management of power in a node of a home entertainment network.

DESCRIPTION OF THE RELATED ART

Energy conservation is becoming more important to the home entertainment networking industry. Accordingly, devices that are used within a home entertainment communications network are increasingly being asked to use less energy. One industry standard for defining the communications that take place over a home entertainment communications network has been established by the Multimedia Over Coaxial Alliance (MoCA). The nodes of a MoCA network must remain actively engaged with each other and more particularly with a network coordinator (NC) that is responsible for managing the network. Remaining actively engaged requires each of the nodes to expend a relatively large amount of energy over the course of an average day.

Currently, if a first node has data to be communicated to a second node, the first node will send a communication known as a reservation request to the NC of the network. The NC will then dictate to all of the network nodes when the first node will be using the network to send the data to the second node by assigning a transmission slot and communicating the assignment to the rest of the network in a Media Access Plan (MAP) packet. Upon receiving the MAP packet, the first node will prepare to send the data during the assigned transmission slot and the second node will prepare to receive the data during the assigned transmission slot. However, if the second node is not continuously monitoring the MAP packets sent by the NC, the second node will not be aware that the first node will be transmitting data meant to be received by the second node.

Therefore, there is a need for a mechanism by which a first MoCA node can detect and respond to a second node that has data for that first node without expending the relatively large amount of energy currently required to monitor the MAP packets.

SUMMARY OF DISCLOSED METHOD AND APPARATUS

Two low power states are disclosed herein to allow a Multimedia over Coax Alliance (MoCA) node to reduce the amount of power consumed while remaining in compliance with the MoCA 2.0 industry standard. In accordance with one embodiment of the disclosed method and apparatus, a MoCA 2.0 node can enter a lower power state when it has no traffic activities (i.e., no data to either send or receive) or when a high layer triggers the node to enter the lower power state. In accordance with one embodiment, before entering a lower power state, the MoCA node will follow a procedure to notify all other nodes on the network, including a Network Controller (NC), of its "RETURN configuration". Doing so will inform the other MoCA nodes of the network that they should not deliver traffic (i.e., data), other than specified packets, to a node that is in a lower power state. Other nodes can cause a node to "RETURN" from a first lower power (FLP) state using its specified packet and communicate with the node normally after it RETURNs. A node in a second lower power (SLP) state can only RETURN upon receipt of a high layer RETURN trigger.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Definitions:

MoCA 2.0—A successor Physical Media Access Control (PHY MAC) specification to the previous Multimedia over Coax Alliance (MoCA) 1.1 PHY MAC specification.

Flow—A uni-direction (i.e., single direction) traffic stream sourced from one MoCA node and having one or more other MoCA nodes as its destination.

MAC Service Data Units (MSDU)—Information that is delivered as a unit between MAC service access points. For example, an Ethernet data frame is a common MSDU. An MSDU should contain the frame check sequence (FCS) of the original data frame if MoCA cannot reproduce the FCS.

MoCA 2.0 node—A network device that implements MoCA 2.0 MAC and PHY layers.

MoCA 1.1 PHY—The PHY of MoCA 1.0. It operates with a channel bandwidth of 50 MHz.

MoCA 2.0 PHY—The PHY of MoCA 2.0. It operates with a channel bandwidth of 100 MHz.

Protocol Data Unit (PDU)—A complete MSDU or a fragment of a MSDU. The two terms of PDU and packet are used interchangeably in this document.

Abbreviations

| Term | Description |
| --- | --- |
| A-PDU | Aggregate PDU |
| AES | Advanced Encryption Standard |
| DAU | Data Allocation Unit |
| FCS | Frame check sequence |
| PAU | Probe Allocation Unit |
| PER | Packet error rate |
| PHY | Physical Layer |
| NC | Network Controller |

A MoCA 2.0 client node has four power states:

Normal power (NP) state: The node is fully powered and can send and receive packets.

First lower power (FLP) state: The node consumes little power and is able to RETURN on MoCA (RoM).

Second lower power (SLP) state: The node consumes very little power and is able to return to previous configured network, but not RoM.

Off: The node powers off.

Figure 1:
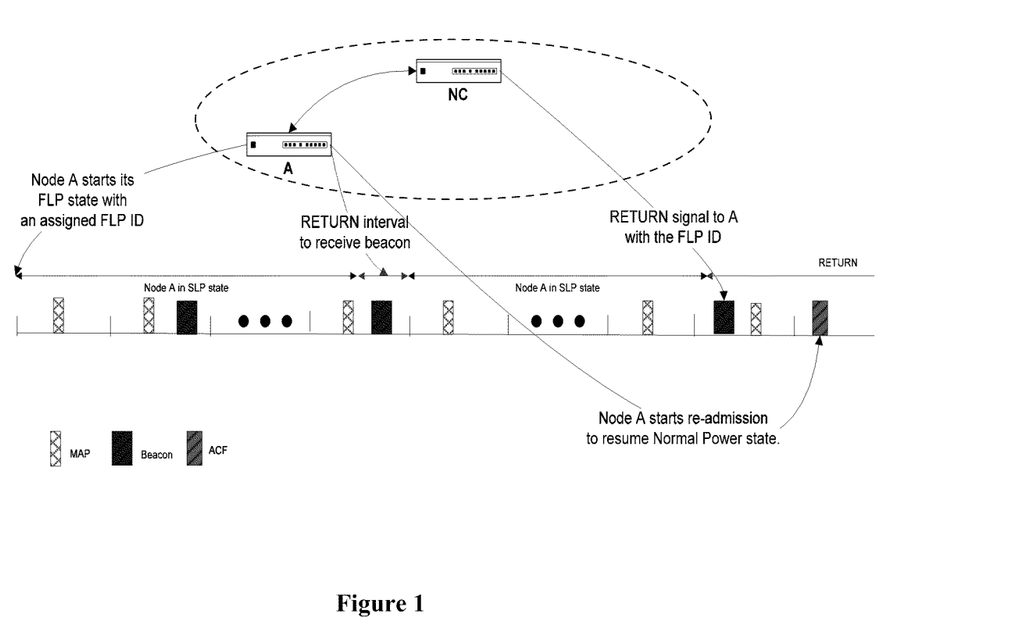
FIG. 1 illustrates a Low power state of operation for a client node.

FIG. 1 shows an example of the FLP state operation for a client node. In accordance with one embodiment of the disclosed method and apparatus, the node will enter the FLP state when the node has no traffic (i.e., data) to send. In one embodiment, the node also knows when there is no traffic to receive. In that case, the node will enter the FLP state when there is neither traffic to send nor traffic to receive. In yet another embodiment, the node will enter the FLP state if the node receives a lower power trigger from the high protocol layer. It will be understood that any combination of these factors may be used to trigger the node to enter FLP state.

When the node enters the FLP state, it is assigned a low power state identifier (LPID) by the NC. In the FLP state, the node listens to beacons at fixed intervals. The NC causes the node to "RETURN" from the FLP state using beacons if there is traffic (i.e., data packets) destined for the node (i.e., addressed to be received by the node) and the node is configured for "RETURN-on-MoCA". After RETURN, the node needs to go through the admission process to rejoin to the network. In accordance with one embodiment in which the network is compliant with MoCA 1.x, the NC differentiates a returned node from a new node by using a parameter known as a "Globally Unique Identifier" (GUID) that is provided in the Admission Request message. GUIDs act as a 64-bit unique identifier for each MoCA node.

Figure 2:
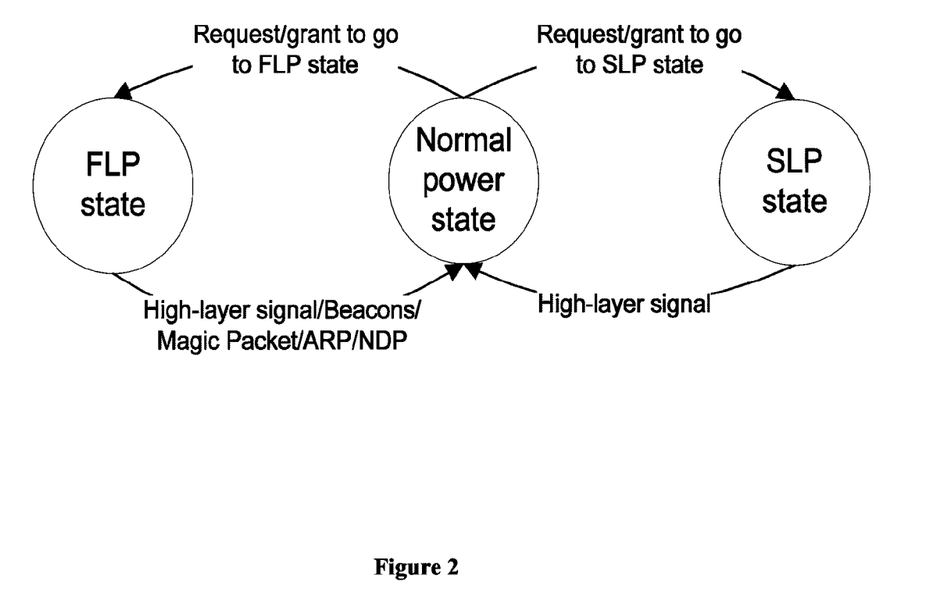
FIG. 2 shows the state transitions among a normal power (NP) state, a first lower power (FLP) state and a second lower power (SLP) state.

FIG. 2 shows the state transitions between a normal power (NP) state, a FLP state and an SLP state. When in the SLP state, a node does not listen to the beacons as often as in the FLP state. A node in SLP state cannot RETURN in response to packets coming from the MoCA network. In accordance with one embodiment of the disclosed method and apparatus, a high layer RETURN trigger is the mechanism used to RETURN a node that is in the SLP state.

Figure 3:
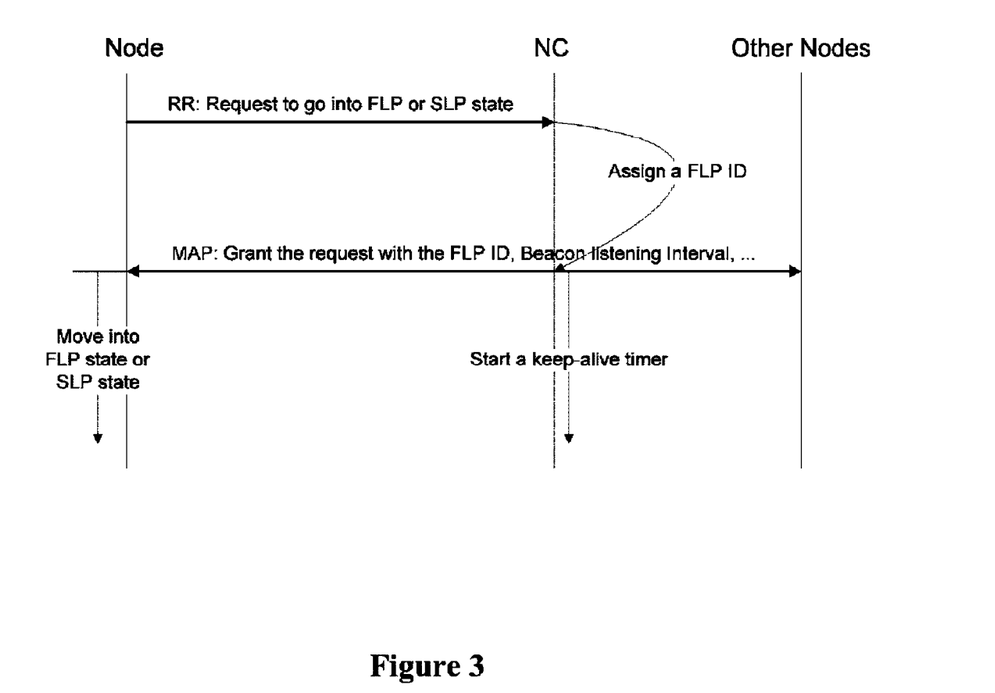
FIG. 3 shows a simple request-grant scheme to move a node into the FLP state or SLP state.
Figure 4:
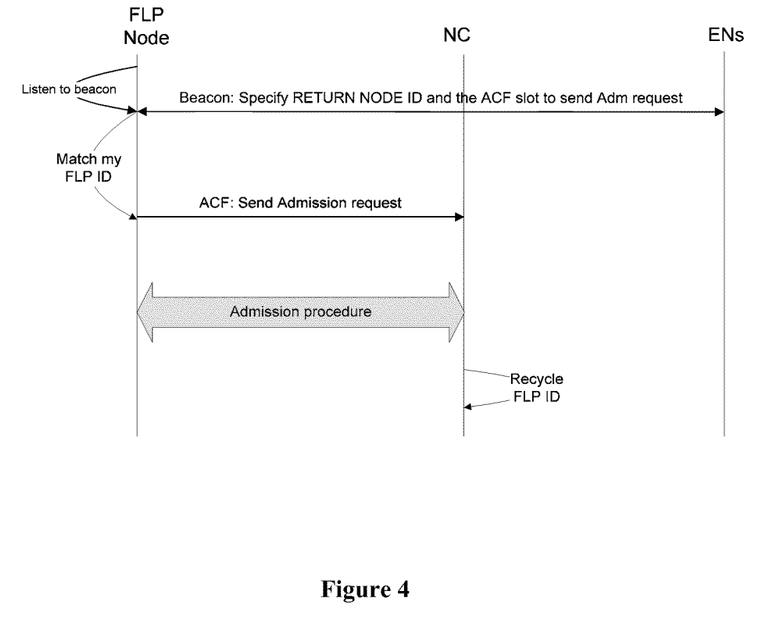
FIG. 4 illustrates the nodes transition out of FLP state.

In accordance with one embodiment of the disclosed method and apparatus, nodes follow a simple request-grant scheme specified in FIG. 3 to enter the FLP state or SLP state.

When a node determines that the conditions are appropriate to enter the low power state, it sends a reservation request (RR) frame with a low power request information element (IE), as defined by Table 1. It should be noted that throughout this disclosure, "0x" denotes that a hexidecimal value follows. For example, "0x11" is the equivalent of hexidecimal "11" and binary "0001 0001".

TABLE 1

Low Power Request IE Format in Reservation Request

| Field | Length | Explanation |
| --- | --- | --- |
| FRAME_SUBTYPE | 4 bits | 0x3 - FLP state request |
| FRAME_TYPE | 4 bits | 0x7 |
| LENGTH | 6 bits | 0 (which corresponds a length of 32 bits) |
| RESERVED | 2 bits | Type III |
| | | Protocol IE Payload |
| RETURN ON MOCA | 8 bits | Bitfield with events which MUST RETURN the node. If a bit is set to 1, the corresponding event MUST RETURN the node; if 0, the event cannot RETURN the node.<br>Bit 7 - RETURN on Unicast Packet<br>Bit 6 - RETURN on Magic Packet<br>Bit 5 - RETURN on ARP<br>Bit 4 - RETURN on IPv6 NDP<br>All other bits are reserved |
| RESERVED | 8 bits | Type III |

In this IE, the node specifies RETURN options associated with the node, such as RETURN on Unicast Packet, RETURN on Magic Packet, RETURN on ARP, and RETURN on NDP. In one embodiment, if a node is going to enter SLP state, it sets all the RETURN configuration bits to zero. In one such embodiment, the node has no transmission request elements in this RR frame, no pending data in its transmission queues, and no ongoing Parameterized Quality of Service (PQoS) flows, when it requests to enter low power. In one embodiment, if the node is a backup NC, it cannot go to FLP state unless all nodes are in FLP state (with the exception of itself and the NC).

Upon reception of the RR with a low power request IE, the NC grants the low power request by embedding a low power grant information element in the following MAP frame. The low power grant IE is defined by Table 2.

TABLE 2

Low Power Grant IE Format in MAP

| Field | Length | Explanation |
| --- | --- | --- |
| FRAME_SUBTYPE | 4 bits | 0x4 - FLP state granting |
| FRAME_TYPE | 4 bits | 0x7 |
| LENGTH | 6 bits | 1 (which corresponds a length of 64 bits) |
| RESERVED | 2 bits | Type III |
| | | Protocol IE Payload |
| REQUEST NODE ID | 8 bits | The node ID that requested the FLP state |
| LPID | 8 bits | The ID to identify the node in the lower power state for RETURN to normal power state later. |

TABLE 2-continued

Low Power Grant IE Format in MAP

| Field | Length | Explanation |
|---|---|---|
| RETURN ON MOCA | 8 bits | The events that MUST RETURN the node. If a bit is set to 1, the corresponding event MUST RETURN the host; if it is 0, the event cannot RETUREN the host.<br>Bit 7 - RETURN on Unicast Packet<br>Bit 6 - RETURN on Magic Packet<br>Bit 5 - RETURN on ARP<br>Bit 4 - RETURN on IPv6 NDP<br>All other bits are reserved |
| TIME TO FIRST BEACON | 8 bits | Time to the first beacon to which the node MUST listen, in units of beacon interval (10 msec). The maximum value is 2.55 sec. The time is with respect to the first beacon following this MAP IE. The value is valid only for a FLP state node. If a node is going to SLP state, it should ignore this value. |
| LISTENING INTERVAL | 8 bits | Beacon listening interval in units of beacon interval (10 msec). The maximum listening interval is 2.55 sec.<br>The value is valid only for a FLP state node. If a node is going to SLP state, it should ignore this value. |
| KEEP-ALIVE TIMEOUT | 8 bits | Time before the NC assumes the node disconnected, in units of 10 times beacon intervals (100 msec). The maximum value is 25.5 sec.<br>This value can be different for FLP state nodes and SLP state nodes. |
| RESERVED | 8 bits | Type III |

In the low power grant IE, the NC assigns a LPID to the node entering FLP state. The LPID may equal the node ID assigned in the admission procedure. In one embodiment, the NC does not re-assign the ID of a node in FLP state or in SLP state to any newly admitted node. In one embodiment, the NC will use the GUID provided during an admission process when a node is RETURNing to determine the node ID that was previously assigned. The NC will then reassign the node ID that was previously assigned to the RETURNing node.

In the low power grant IE, the NC also specifies a beacon listening interval (i.e., the time to the first beacon to which the node will listen), and a keep-alive timeout value.

Upon reception of the MAP with the low power grant IE, the node records its LPID and moves into the FLP state; other nodes in the network also record this node's power state as well as the RETURN options associated with the node that requested to enter the FLP state.

In one embodiment, a node in the FLP state will listen to the specified beacons at fixed intervals indicated in the lower power grant IE. For each received beacon message, the node inspects a RETURN NODE ID field, the Admission Control Frame (ACF) type field, and the MOCA VERSION field. In one embodiment, if the LPID of the node appears in the RETURN NODE ID field, the node will initiate a network admission process. If the ACF type is 0x20 (i.e., hexidecimal value of "20"), Broadcast packets (ARP/Magic Packet/IPv6 NDP), the node should listen to the ACF slots followed by this beacon.

In order to let the NC know that a FLP state node is still alive, the node should periodically send a still-alive message to the NC. For each FLP state node, the NC sets up a keep-alive timer when the node moves to the lower power state. If the NC does not receive any still-alive message from the FLP state node before time out, it assumes that this node has been disconnected, and then recycles its LPID and node ID and eliminates its record at the NC.

In one embodiment, a FLP state node uses Discovery Request to notify the NC that it is still alive. Before its keep-alive time out, the node listens to beacons to find a beacon with ACF type=MoCA 2.0 Discovery TX. If there is one, the node transmits a Discovery Request in the scheduled ACF slots with a still-alive information element, as defined by Table 3.

TABLE 3

Still-Alive IE in Discovery Request

| Field | Length | Value |
|---|---|---|
| | | IE Header |
| DISCOVERY IE ID | 8 bits | 0x4 |
| LENGTH | 8 bits | 0<br>Actual length in bytes = (LENGTH + 1) * 4 |
| | | IE Payload |
| LPID | 8 bits | The ID of the FLP state node |
| RETURN ON MOCA | 8 bits | The events to RETURN the host. If a bit is set to 1, the corresponding event can RETURN the host; if 0, the event cannot RETURN the host.<br>Bit 7 - RETURN on Unicast Packet<br>Bit 6 - RETURN on Magic Packet<br>Bit 5 - RETURN on ARP<br>Bit 4 - RETURN on IPv6 NDP<br>All other bits are reserved |

Upon receiving this Discovery Request message, the NC transmits a Discovery Response in the ACF slots scheduled by the next beacon that the node will listen to. The Discovery Response includes a still-alive response IE, as defined by Table 4, which notifies the FLP state node that the NC has received its still-alive message and re-set its keep-alive timer.

TABLE 4

Still-Alive Response IE in Discovery Response

| Field | Length | Value |
|---|---|---|
| | | IE Header |
| DISCOVERY IE ID | 8 bits | 0x5 |
| LENGTH | 8 bits | 1<br>Actual length in bytes = (LENGTH + 1) * 4 |
| | | IE Payload |
| LPID | 8 bits | The ID of the FLP state node |
| RETURN ON MOCA | 8 bits | The events to RETURN the host. If a bit is set to 1, the corresponding event can RETURN the host; if 0, the event cannot RETURN the host.<br>Bit 7 - RETURN on Unicast Packet<br>Bit 6 - RETURN on Magic Packet<br>Bit 5 - RETURN on ARP<br>Bit 4 - RETURN on IPv6 NDP<br>All other bits are reserved |
| KEEP-ALIVE TIMEOUT | 8 bits | Time before the NC assumes the node disconnected, in units of 10 times beacon intervals (100 msec). The maximum value is 25.5 sec.<br>This value may be different for FLP state nodes and SLP state nodes. |
| RESERVED | 24 bits | |

A node in the SLP state does not need to listen to the specified beacons as in the FLP state node. But, it needs to send a still-alive message to the NC before its keep-alive timer runs out. The still-alive message used by a SLP state node is the same as for a FLP state node.

If a new node is admitted to the network, the NC will RETURN all FLP state nodes, so that all nodes can update their network topology information.

If the NC changes from a MoCA 2.0 node to a MoCA 1.x node, all FLP state nodes will RETURN. A FLP state node will monitor the NC node ID in the beacon and take appropriate action if that changes. The FLP state node does not need to RETURN if the NC node ID changes, but the new NC node is a MoCA 2.0 node.

If the NC fails and no beacons can be detected on the network, all FLP state nodes will initiate a network search procedure.

When a FLP state node or a SLP state node receives a RETURN trigger from its higher layer, it will RETURN immediately and initiate the admission process to re-join the MoCA network. The NC inspects the GUID in the Admission Request. If the GUID indicates that this is a returned node, the NC MUST assign it the node ID that has been used before FLP state or SLP state.

In one embodiment, if an ingress node receives a unicast data packet that is addressed to be received by a node in FLP state or in SLP state, the ingress node first inspects the RETURN options associated with the destination node. In one such embodiment, a RETURN on Unicast bit associated with the destination node will indicate whether the ingress node can RETURN the destination node. If the RETURN on Unicast bit is zero, the ingress node drops the packet and does not send a transmission request. If the RETURN on Unicast bit is one, the ingress node buffers the packet and sends a transmission request in the next RR.

In one embodiment, upon reception of a transmission request intended to a FLP state node, the NC will not grant the request but should RETURN the node. To RETURN it, the NC signals in three consecutive beacons (that the FLP state node will listen to) with the LPID specified. Note that the NC can only RETURN one node at a time.

TABLE 5

MoCA 2.0 Beacon Frame Format with PMG support

| Field | Length | Explanation |
|---|---|---|
| TRANSMIT_CLOCK | 32 bits | System clock when beacon transmission begins on the medium (beginning of preamble). |
| BEACON VERSION | 8 bits | =0x00 |
| MOCA VERSION | 8 bits | The Lowest MOCA_VERSION_NUMBER of all nodes in the network.<br>0x10 - MoCA 1.0<br>0x11 - MoCA 1.1<br>0x20 - MoCA 2.0 |
| CHANNEL NUMBER | 8 bits | RF channel number on which this beacon is being sent (Channel center frequency = 25 MHz•Channel Number. 32 is the lowest value allowed for this field. This corresponds to 800 MHz center frequency). |
| TABOO MASK START | 8 bits | RF channel number of the lowest frequency channel covered by the Taboo Channel Mask field. |
| TABOO CHANNEL MASK | 24 bits | Bit value 1 = unusable channel<br>MSB = lowest frequency in the range (starting at Taboo Mask Start frequency). |
| CHANGE FIELD | 6 bits | Used to indicate upcoming NC handoff. |
| SEQUENCE NUMBER | 2 bits | Countdown to NC handoff. |
| BACKUP NC ID | 6 bits | Node ID of the backup NC. If no backup NC is available, NC fills this field with its own ID. |
| NEXT BEACON POINTER | 6 bits | Number of milliseconds to the next beacon transmission. This value MUST be equal to 10. This is equivalent to 500,000 SLOT_TIME's. |
| NEXT NC ID | 6 bits | Node ID of the new NC (NC being handed off to) This field is meaningful only when a handoff is signaled. |
| ACF LENGTH | 16 bits | Duration in units of SLOT_TIME of the following Admission Control Frame |
| ACF TYPE | 8 bits | Indicates what type of admission frame is scheduled |

TABLE 5-continued

MoCA 2.0 Beacon Frame Format with PMG support

| Field | Length | Explanation |
|---|---|---|
| | | 0x00-0x0F - Same as in MoCA 1.0 |
| | | 0x10 - Initial Type I Probe TX by NC in MoCA 2.0 PHY |
| | | 0x11 - Initial Type II Probe Report TX to NC in MoCA 2.0 PHY |
| | | 0x12 - Type II Probe TX by NC in MoCA 2.0 PHY |
| | | 0x13 - Type C Loopback Transmission by NN in MoCA 2.0 PHY |
| | | 0x14 - Type II Probe RX by NC in MoCA 2.0 PHY |
| | | 0x15 - Type C Loopback Transmission by NC in MoCA 2.0 PHY |
| | | 0x16 - Type I Probe TX by NC in MoCA 2.0 PHY |
| | | 0x17 - Type I Probe Report TX to NC in MoCA 2.0 PHY |
| | | 0x18 - GCD Report TX by NC in MoCA 2.0 PHY |
| | | 0x19 - Link Acknowledgement in MoCA 2.0 PHY |
| | | 0x1A - Type II Link Acknowledgement in MoCA 2.0 PHY |
| | | 0x1B - MoCA 2.0 Discovery TX in MoCA 2.0 PHY |
| | | 0x1C - MoCA 2.0 Discovery Response TX in MoCA 2.0 PHY |
| | | 0x1D - MoCA 2.0 Admission Request in MoCA 2.0 PHY |
| | | 0x1E - MoCA 2.0 Admission Response in MoCA 2.0 PHY |
| | | 0x1F - MoCA 2.0 Link Acknowledgement in MoCA 2.0 PHY |
| | | 0x20 - Broadcast packets (ARP/Magic Packet/IPv6 NDP) |
| | | 0x21-0xFF - Reserved |
| ACF POINTER | 18 bits | Transmission time of the next Admission Control Frame from the beginning of this BSI, in multiples of SLOT_TIME. This transmission MUST be scheduled at least T5 seconds after the start of the beacon transmission. |
| ASYNCHRONOUS MAP LENGTH | 16 bits | Duration in multiples of SLOT_TIME |
| ASYNCHRONOUS MAP PROFILE | 8 bits | The PHY profile used for transmitting the first asynchronous MAP following this beacon transmission |
| ASYNCHRONOUS MAP POINTER | 18 bits | Transmission time of the next Asynchronous MAP from the beginning of this BSI, in units of SLOT_TIME. Value '0' in this field indicates that no Asynchronous MAPs are sent in the beacon period. This transmission MUST be scheduled at least T5 seconds after the beacon transmission. |
| CENTRAL CHANNEL NUMBER | 8 bits | Relative RF channel number of the central frequency of the MoCA 2.0 frequency band to the channel number in CHANNEL NUMBER field. Valid only when NC is MoCA 2.0 capable.<br>Bit 0 - Indicate the relative position of the central frequency to the CHANNEL NUMBER. 0 indicates on the left of the CHANNEL NUMBER and 1 on the right.<br>Bit 1:2 - Indicate the relative offset of the channel number of the central frequency from the CHANNEL NUMBER.<br>E.g. 000 or 100 indicates that the central frequency is CHANNEL NUMBER. 010 indicates that the central frequency is CHANNEL NUMBER + 2. |
| CHANNEL NUMBER FOR BONDED CHANNEL | 8 bits | Channel number of the central frequency for the bonded channel. Valid only when NC is MoCA 2.0 capable and supports channel bonding. |
| RETURN NODE ID | 4 bits | LPID of the node that needs to RETURN. |
| DISCOVERY CAPABILITY | 1 bit | 0x0 - Not support pre-admission discovery<br>0x1 - Support pre-admission discovery |
| RESERVED | 21 bits | Type III |

TABLE 5-continued

MoCA 2.0 Beacon Frame Format with PMG support

| Field | Length | Explanation |
| --- | --- | --- |
| NCID | 6 bits | Node ID of the Network Coordinator |
| RESERVED | 10 bits | Type III |
| BEACON FCS | 32 bit | FCS over all bits (using same algorithm as MAC Frame payload FCS) |

If a node in the FLP state detect its LPID in the RETURN NODE ID field of a beacon and the ACF type as indicated in the ACF TYPE field in the beacon indicates that the ACF is a MoCA 2.0 Admission Request, the node initiates the admission process to rejoin the network. After the admission process is finished, the NC recycles the LPID. Any node that was trying to send packets will re-try to send all the buffered packets to this node. The procedure is shown in FIG. 3.

Magic Packet, IPv4 ARP packet, and IPv6 NDP packet are broadcast packets (Magic Packet can be unicast) and need to be sent to all the nodes including the FLP state nodes. When a node receives such a packet that is to be sent out over the network, the node first makes a transmission request and then broadcasts the request to all nodes that are in the normal power state. The request is made at the time specified in the MAP.

When the NC receives the transmission request, the NC first inspects the type of packet that the node is requesting to transmit. The NC then looks up its records to see if any FLP state nodes wish to RETURN on this type of packet. If no FLP state nodes wish to RETURN on this type, the NC drops the packet immediately. If there is at least one node that wishes to RETURN on this type, the NC will schedule to relay this packet to the FLP state nodes.

In the next beacon to which all FLP state nodes will listen, the NC sets the ACF type to 0x20, which means the next ACF slot is scheduled for the transmission of a Magic packet, an ARP packet, or an NDP packet. The FLP state nodes that are configured to RETURN on any one of these packets should listen to the ACF slot. The RETURN NODE ID field in the beacon should be set to zero.

If a FLP state node's MAC address matches the address in the Magic packet, ARP packet, or NDP packet and the node is configured to RETURN on this packet type, the node will the return that part of the node that is necessary to respond to the packet type (e.g., the host processor if one exists) to the full power state and it will initiate the admission process. The NC recycles the LPID after re-admission (i.e., release the ID for use by another node later). If the MAC address in the Magic packet, ARP packet or NDP packet does not match the MAC address of the node or the node is not configured to RETURN on this packet type, the node discards the received packet.

Figure 5:
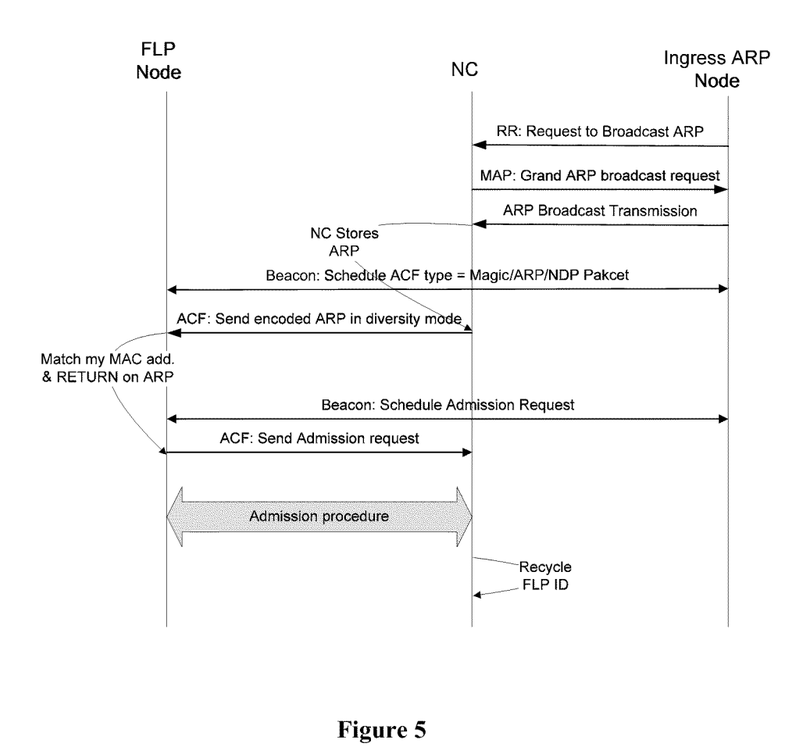
FIG. 5 specifies the procedure for RETURN.
Figure 6:
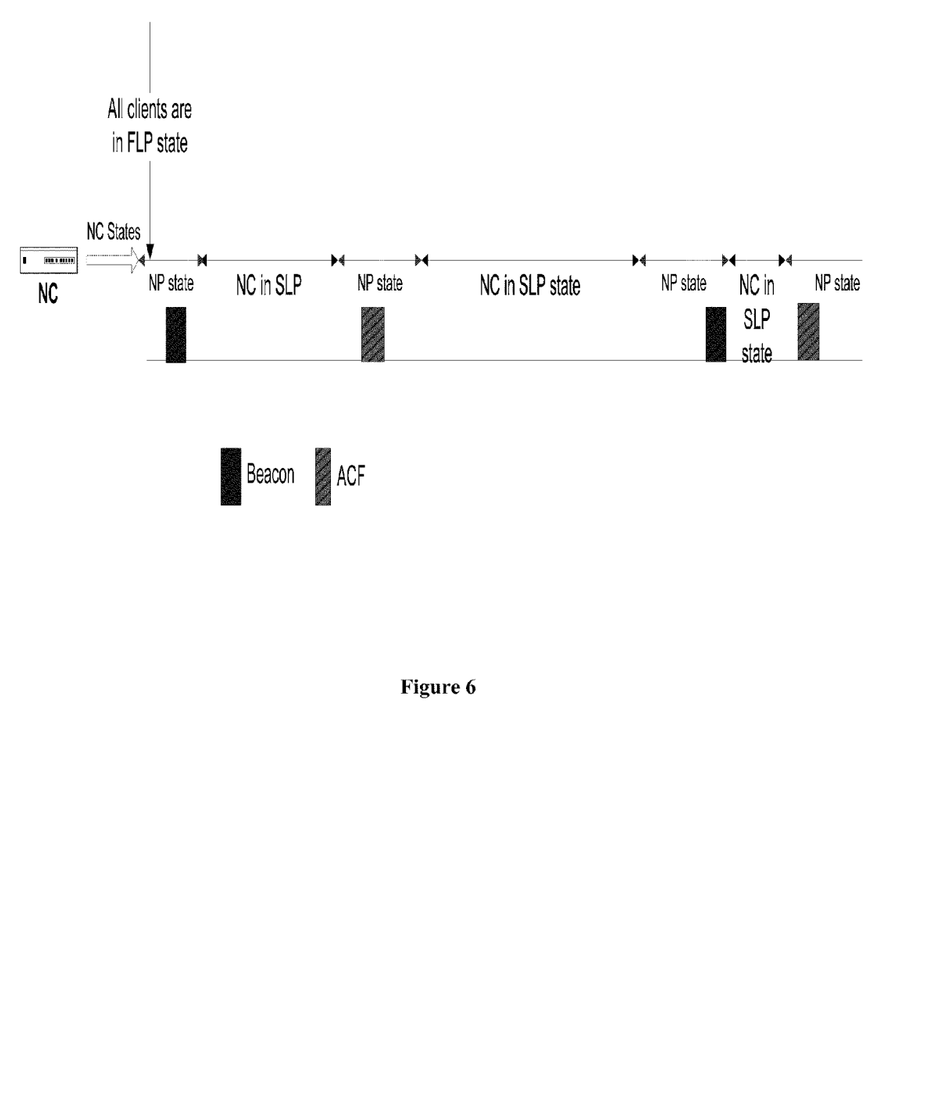
FIG. 6 shows a network controller opportunistic FLP state operation.

FIG. 5 specifies the procedure for RETURN on ARP. The procedures of RETURN on Magic Packet and RETURN on NDP are similar. The NC can change to the FLP state under predefined conditions. For example, as shown in FIG. 6, the NC can go to the FLP state only when all client nodes are in FLP state or SLP state. But, in one embodiment, the NC will keep broadcasting beacons every 10 msec and keep receiving ACF transmission scheduled via beacons, even when in the FLP state.

The network exits the network FLP state, when the NC and at least one other node become active. In one embodiment, in that case, the NC will also RETURN the back-up NC.

Figure 7:
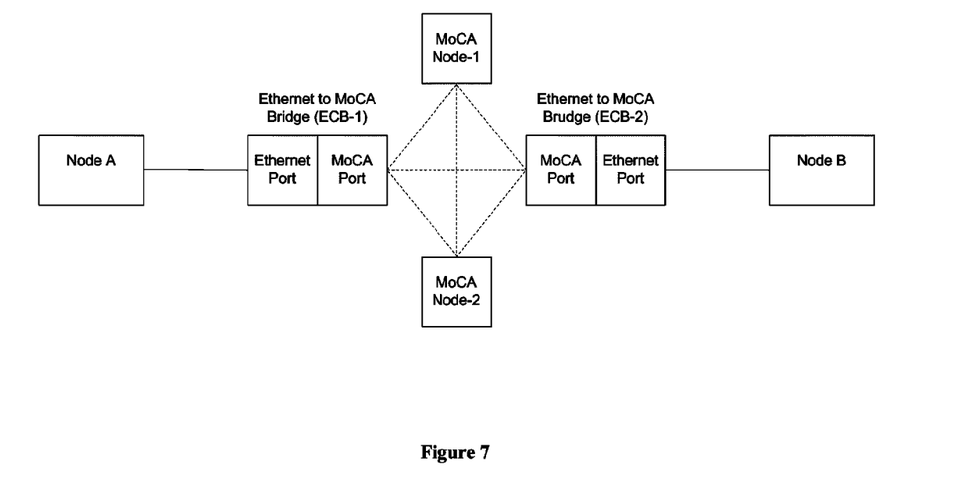
FIG. 7 shows a MoCA network with a MoCA bridge.

FIG. 7 shows a MoCA network with a MoCA bridge. A MoCA bridge may decide to go to the FLP state 1) after no traffic on either port for longer than a pre-configured period, e.g., 5 minutes; or 2) after it receives a FLP state trigger from the high layer. In one embodiment, in the FLP state request IE, the bridge will set all RETURN bits to ones. This means that it would like to RETURN on any broadcast or unicast packets coming from MoCA port. The RETURN process is the same as that of client node. The bridge will forward any packet received at the MoCA port to the Ethernet port. On the other side, any traffic at the Ethernet port can RETURN the bridge. The RETURN process follows the high-layer driven RETURN.

In a mixed network with MoCA 1.x nodes, it is still possible for a MoCA 2.0 node to go to FLP state or SLP state, as long as the NC is a MoCA 2.0 node. The FLP state operation will be transparent to the MoCA 1.x nodes in the network. If however the NC switches from a MoCA 2.0 to a MoCA 1.x node, all FLP state nodes initiate re-admission.

In one embodiment of the disclosed method and apparatus, the following set of requirements are implemented in an industry standard, such as MoCA 2.0. Implementing these requirements ensures that devices that are compliant with the standard are compatible with one another. However, it will be clear to those skilled in the art that this is only one embodiment and other embodiments are possible in which these requirements are not required or present. In accordance with the first requirement, the industry standard specifies a RETURN on MoCA protocol. In addition, the standard enables power efficient FLP states in which a device in the FLP state can RETURN on MoCA (ROM). A network FLP state is defined in which all of the devices in the network are in the FLP state, including the NC. In the network FLP state each node can RETURN synchronously and reform the network.

A device SLP state is defined in which the node can RETURN to the previously configured network—but not ROM.

The device recovery time is preferably as short as possible with the following guidelines to be considered: 6 sec from FLP state to pass data; 30 sec from SLP state to pass limited data; 60 sec from power on to pass limited data.

In one embodiment, the RETURN on MoCA should resemble RETURN on LAN protocols that currently exist in MoCA.

In accordance with one embodiment of the disclosed method and apparatus, while in the FLP state, the MoCA network should maintain synchronization, network topology and basic network functionality (beacons, control signals) to enable fast recovery times. In one embodiment, no higher layer data is passed.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus.

The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.:

What is claimed is:

1. A method of implementing a home entertainment network comprising:
   entering a first of at least three power states within a node of the home entertainment network when either the node has no traffic to send or the node receives a trigger;
   entering a second of the three power states in response to receipt of a beacon, if the node is configured for RETURN-on-MoCA;
   entering an admission process to rejoin to the network after leaving the first power state; and
   entering a third power state of the three power states upon receipt of a message granting a request for the third power state, the node monitoring beacons less frequently in the third power state than in the first power state.

2. The method of claim 1, wherein the first power state is a FLP state, the second power state is a normal power state and the third power state is an SLP state.

3. The method of claim 1, wherein the beacon is received in response to there being at least one data packet addressed to be received by the node.

4. The method of claim 2, wherein the network includes a network coordinator (NC) and the NC assigns a low power state identifier (LPID) when the node enters the FLP state.

5. The method of claim 2, wherein the node, when in the FLP state, monitors beacons at fixed intervals.

6. The method of claim 1, wherein the network includes an NC and the NC uses a Globally Unique Identifier (GUID) in the Admission Request message to differentiate a returned node from a new node.

7. The method of claim 2, wherein the node does not monitor beacons in the SLP state.

8. The method of claim 2, wherein the node transmits a request to enter SLP state to the NC when the node determines that the conditions are appropriate to enter the SLP state.

9. The method of claim 8, wherein the request to enter the SLP state is transmitted within a reservation request (RR).

10. The method of claim 9, wherein the RR includes RETURN options.

11. The method of claim 10, wherein the RETURN options are indicated by RETURN configuration bits that indicate at least RETURN on Unicast Packet, RETURN on Magic Packet, RETURN on ARP and RETURN on IPv6 NDP.

12. The method of claim 11, wherein if a node is going to enter SLP state, said node sets all the RETURN configuration bits to indicate that said node will not return to the normal power state on any of the actions.

13. The method of claim 2, wherein the node transmits a request to enter FLP state to the NC when the node determines that the conditions are appropriate to enter the FLP state.

14. The method of claim 13, wherein the request to enter the FLP state is transmitted within a reservation request (RR).

15. The method of claim 14, wherein the RR includes RETURN options.

16. The method of claim 15, wherein the RETURN options are indicated by RETURN configuration bits that indicate at least RETURN on Unicast Packet, RETURN on Magic Packet, RETURN on ARP and RETURN on IPv6 NDP.

17. The method of claim 1, wherein if said node is a backup NC, said node cannot go to the FLP state unless all nodes are in the FLP state except said node and the NC.

18. The method of claim 9, wherein the NC responds to the request to enter FLP state by transmitting a grant in the next media access plan (MAP).

19. The method of claim 18, wherein the NC assigns a LPID to the requesting node entering FLP state and transmits the LPID in the grant.

20. The method of claim 19, wherein the LPID is equal to a node ID assigned during an admission procedure.

21. The method of claim 20, wherein the NC does not re-assign the ID of a node in FLP state to any newly admitted node.

22. The method of claim 18, wherein the NC specifies a beacon listening interval in the response to the request to enter FLP state.

23. The method of claim 19, wherein the grant includes the RETURN options associated with the requesting node.

24. The method of claim 23, wherein the indications include configuration bits that indicate at least RETURN on Unicast Packet, RETURN on Magic Packet, RETURN on ARP and RETURN on IPv6 NDP.

25. The method of claim 1, wherein the message granting the request for the third power state is a MAP message received from a network coordinator (NC) of the network.

26. A method of implementing a home entertainment network comprising:
    entering a first of at least three power states within a node of the home entertainment network when the node has no traffic to send and no traffic to receive;
    entering a second of the three power states in response to receipt of a beacon, if the node is configured for RETURN-on-MoCA;
    entering an admission process to rejoin to the network after leaving the first power state; and
    entering a third power state of the three power states upon receipt of a message granting a request for the third power state, the node monitoring beacons less frequently in the third power state than in the first power state.

\* \* \* \* \*